US006833404B2

(12) United States Patent
Quinn et al.

(10) Patent No.: US 6,833,404 B2
(45) Date of Patent: Dec. 21, 2004

(54) HOT MELTS UTILIZING A HIGH GLASS TRANSITION TEMPERATURE SUBSTANTIALLY ALIPHATIC TACKIFYING RESIN (75) Inventors: Thomas H. Quinn, St. Paul, MN (US); Steven W. Albrecht, Forest Lake, MN (US); Beth M. Eichler-Johnson, St. Paul, MN (US); David B. Malcolm, Maplewood, MN (US); Lisa L. Ryan, Maple Grove, MN (US)

(73) Assignee: H.B. Fuller Licensing & Financing Inc., St. Paul, MN (US)

( * ) Notice: Subject to any disclaimer, the term of this patent is extended or adjusted under 35 U.S.C. 154(b) by 0 days.

(21) Appl. No.: 09/300,544

(22) Filed: Apr. 27, 1999

(65) Prior Publication Data

US 2003/0139516 A1 Jul. 24, 2003

Related U.S. Application Data (60) Provisional application No. 60/091,231, filed on Jun. 30, 1998.

(51) Int. Cl.[7] .................................................. C08K 5/01

(52) U.S. Cl. ........................ 524/487; 524/474; 524/297; 524/518

(58) Field of Search ................................. 524/297, 487, 524/518, 474

(56) References Cited

U.S. PATENT DOCUMENTS

| 4,102,834 A | 7/1978 | Morimoto et al. .............. 260/4 |
| 4,330,655 A | 5/1982 | Bullard ....................... 526/283 |
| 4,629,766 A | 12/1986 | Malatesta et al. ............ 525/222 |
| 5,149,741 A | 9/1992 | Alper et al. ................... 525/95 |
| 5,171,793 A | 12/1992 | Johnson et al. ........... 525/332.1 |
| 5,410,004 A | 4/1995 | Williams ..................... 526/237 |
| 5,552,489 A | 9/1996 | Merrill et al. ............... 525/210 |
| 5,691,432 A | 11/1997 | Williams ..................... 526/283 |

FOREIGN PATENT DOCUMENTS

| WO | WO 97/15635 | 5/1997 |
| WO | WO 97/33921 | * 9/1997 |

* cited by examiner

Primary Examiner—Peter D. Mulcahy (57) ABSTRACT

This invention relates to an improved hot melt adhesive comprising a tackifying resin wherein the resin is substantially aliphatic and has a glass transition temperature of greater than 65° C. and a thermoplastic polymer.

32 Claims, 1 Drawing Sheet

FIGURE 1

HOT MELTS UTILIZING A HIGH GLASS TRANSITION TEMPERATURE SUBSTANTIALLY ALIPHATIC TACKIFYING RESIN

RELATED APPLICATIONS

This application claims the priority of U.S. provisional patent application Ser. No. 60/091,231 filed Jun. 30, 1998.

FIELD OF THE INVENTION

This invention relates to improved hot melt adhesive compositions utilizing a hydrogenated substantially aliphatic tackifying resin having a high glass transition temperature. The adhesive compositions have surprisingly high heat resistance combined with good cold temperature flexibility, light color and excellent color stability.

BACKGROUND OF THE INVENTION

Hot melt adhesives generally comprise a thermoplastic polymeric component, a tackifying resin component and either a wax component, plasticizing component or a combination thereof.

The tackifying resin is known to provide specific adhesion and to increase peel values which translates into heat resistance. The tackifying resin also generally has the biggest impact on the color of the adhesive. Aesthetic appeal has become extremely important to adhesive users.

Commonly used tackifying resins include those which are rosin derived including gum rosin, rosin acid and rosin ester resins, petroleum derived hydrocarbon resins and terpene based resins which can be derived from d-limonene. These resins may be modified further to add functionality or aromaticity through the addition of phenolic groups or styrene groups, for instance.

It is a constant struggle on the part of adhesives chemists to improve both the heat resistance and cold temperature resistance of hot melt adhesives. The resistance of hot melt adhesive compositions to fluctuations in temperature are particularly important for shipping goods across country through desert conditions as well as through the northern regions in the winter months, and also for storage in warehouses which often may be subject to ambient conditions.

Higher heat resistance is generally achieved through the use of higher levels of tackifying resin and/or higher levels of wax that will typically adversely affect the cold temperature resistance. Good cold temperature resistance is generally improved through the use of liquid components and/or higher levels of the polymer that will typically adversely affect the heat resistance. The polymeric component is often the component in the hot melt adhesive having the lowest glass transition temperature. Hence, it is difficult to improve both of these two critical features of an adhesive formulation simultaneously, since generally one is improved at the expense of the other.

High heat resistance has been achieved through the use of high melting point phenolic modified terpene resins. However, there are safety hazards associated with the production of such resins due to the toxicity of phenol. The cost of these modified terpenes is also higher than petroleum based resins due to the different feedstreams, and also due to the cost of adding the phenol, thereby raising the cost of adhesives to end users which in turn makes them less attractive for large scale production.

Petroleum based hydrocarbon resins are popularly used in the adhesives industry due to availability and economics. These resins may be derived from many different feedstreams produced during the petroleum cracking process including $C_5$, $C_8$, $C_9$ and $C_{10}$. Dicyclopentadiene based resins are derived from $C_{10}$ feedstreams that contain various components of which DCPD may be the major component.

U.S. Pat. No. 4,102,834 to Morimoto et al. issued Jul. 25, 1978 teaches a hydrocarbon resin having a number average molecular weight of 300 to 2500, a softening point of 40° C. to 180° C., a bromine number of 5 to 100 g/100 g, and a Gardner color of 5 to 17. All resins exemplified have softening points from 98° C. to 106° C. The final resin is comprised of the polymerization product of a hydrocarbon fraction boiling within the range of 135° C. to 280° C., which contains various hydrocarbons, and dicyclopentadiene. The resultant resin contains, based on the total weight thereof, 20% to 80% of a unit derived from the dicyclopentadiene.

U.S. Pat. No. 4,629,766 to Malatesta et al. issued Dec. 16, 1986 teaches an improved method of hydrogenating hydrocarbons obtained from the polymerization of various petroleum based feedstreams. The resin feed exemplified therein was a solution of a thermally polymerized hydrocarbon resin obtained by polymerizing a feedstream containing 60 wt-% to 70 wt-% polymerizable monomers comprising substituted and unsubstituted $C_5$ cyclic olefins and $C_{10}$ bicyclic diolefins. No specific adhesive compositions are disclosed.

U.S. Pat. No. 5,410,004 issued Apr. 25, 1995 and U.S. Pat. No. 5,691,432 issued Nov. 25, 1997 both to Williams teaches tackifying resins polymerized from dicyclopentadiene monomer and their use in inks, adhesives, coatings and other related areas. These resins are made in the presence of a Bronsted acids, are unhydrogenated and have Gardner colors in the range of 3 to 5.

U.S. Pat. No. 5,552,489 to Merrill et al. issued Sep. 3, 1996 teaches a process for producing tackifiers through the use of a single-site catalyst with an alpha-olefin and a cyclic monomer under conditions designed to produce low molecular weight. Dicyclopentadiene is disclosed as a suitable cycloolefin comonomer but is taught only in combination with an α-olefin comonomer as well.

U.S. Pat. No. 5,171,793 issued Dec. 15, 1992 to Johnson et al. teaches thermally polymerized hydrocarbon resin and a novel process for hydrogenating said resin wherein the resin is a copolymer of a feed which is a mixture of styrene and indene and derivatives thereof and cyclodiene monomers and dimers and optionally acyclic dienes.

OBJECT OF THE INVENTION

It is an object of the present invention to teach the utilization of dicyclopentadiene based hydrocarbon tackifying resins to achieve improved hot melt adhesive compositions.

SUMMARY OF THE INVENTION

This invention relates to an improved hot melt adhesive composition comprising about 20% by weight to about 50% by weight of at least one substantially aliphatic tackifying resin having a glass transition temperature of 65° C. or higher, about 20% by weight to about 50% by weight of at least one thermoplastic polymer. The resin is preferably a hydrocarbon tackifying resin, derived at least in part, from dicyclopentadiene. The thermoplastic polymer is preferably a homopolymer, copolymer or terpolymer of ethylene, an amorphous polyalphaolefin, a rubbery block copolymer, a homogeneous ethylene/α-olefin interpolymer, and mixtures thereof; and 0% by weight to about 40% by weight of at least one wax. In embodiments that employ a homopolymer, copolymer or terpolymer of ethylene, the total tackifying resin concentration is equal to or less than the total polymer concentration. The glass transition temperature of the tackifying resin is preferably greater than about 70° C.

In another embodiment, the present invention is an adhesive composition comprising from about 10 wt-% to about 80 wt-% of at least one hydrocarbon tackifying resin derived at least in part from dicyclopentadiene and having a Tg greater than about 65° C. and from about 10 wt-% to about 80 wt-% of at least one amorphous polyalphaolefin and/or block copolymer. The tackifying resin is preferably derived predominantly from dicyclopentadiene.

The glass transition temperature of the tackifying resin is greater than about 65° C., preferably greater than about 70° C., more preferably greater than about 75° C., and most preferably greater than about 80° C. The melting point of the tackifying resin as measured by the ring and ball softening point is greater than about 135° C. and preferably greater than about 140° C.

The adhesive composition preferably has peel values of greater than about 60° C., more preferably greater than about 65° C., even more preferably greater than about 70° C., and most preferably greater than about 75° C. Further, the viscosity of the adhesive composition is typically less than about 10,000 cPs at about 175° C., preferably less than about 5000 cPs, more preferably less than about 3500 cPs and most preferably less than about 2000 cPs at about 175° C. Surprisingly and unexpectedly, in light of the high heat resistance, the resultant composition has good cold temperature flexibility.

These adhesives are primarily useful for non-pressure sensitive adhesive applications including bookbinding, packaging and structural applications including wood, construction, automotive, appliance, other types of durable goods and so forth.

DETAILED DESCRIPTION OF THE INVENTION

The present inventors have found that by utilizing tackifying resins with high $T_g$'s, the total amount of resin may be decreased and quite surprisingly, the resultant adhesive compositions have better heat resistance and cold temperature resistance than conventional products. The tackifying resins useful to the present invention are predominantly aliphatic and have glass transition temperatures ($T_g$) of greater than 65° C. Preferably, the $T_g$ is greater than about 68° C., more preferably greater than about 70° C. and most preferably greater than about 75° C. Further, the softening point of the resins is preferably greater than about 135° C. and more preferably greater than about 140° C.

The glass transition temperature, $T_g$, reported may vary depending on which temperature point is used from the DMA curve (the onset temperature or the mid point temperature). In describing the resin employed in the present invention, Tg refers to the onset temperature as determined using Dynamic Mechanical Analysis. The units are generally reportable to plus or minus 1° C.

The resin is preferably utilized in an amount from about 20 wt-% to about 50 wt-% of the adhesive composition, more preferably from about 25 wt-% to about 45 wt-% and most preferably from about 25 wt-% to about 40 wt-%. If a secondary resin is utilized in combination with these resins, the amount of the resin having the high $T_g$ is typically present in an amount of at least about 20 wt-% of the adhesive composition. Further, if the polymer base is an ethylene copolymer, the total resin content is preferably equal to or less than the total polymer content by weight of the adhesive composition to obtain the optimum cold temperature resistance.

The preferred tackifying resins are hydrocarbon tackifying resins derived, at least in part, from dicyclopentadiene. Preferably, the tackifying resin is derived predominantly from dicyclopentadiene. The resins are typically petroleum based resins meaning that the feedstreams used to produce these resins are by-products of the steamcracking process used in the pyrolysis of natural gas, ethane, propane, naphtha, kerosene, light gas oil, heavy gas oil, etc. The pyrolysis of these various fractions result in various products including dicyclopentadiene (DCPD), ethylene, propene, $C_4$, $C_5$ (piperylene for instance) and $C_6$ (styrene for instance) hydrocarbons, $C_8$ and $C_9$ aromatics, $C_{10}$ olefins and diolefins, benzene, ethane, etc. The main purpose of steamcracking is the production of ethylene and propene. The fractions generally used to make petroleum resins are the $C_4/C_5$ streams, the $C_8/C_9$ streams (unsaturated aromatics including styrene and indene to produce aromatic resins) and the DCPD stream. A $C_9$ stream may have styrene, α-methyl styrene, vinyltoluene, DCPD and codimers, indene, methylindenes, naphthalene, etc. A $C_{10}$ stream may have DCPD and indene for instance. Each of these components of these various feedstreams may be polymerized to produce tackifying resins.

Steamcracking involves various steps. It is the effluents from the so-called depentanizer stage of this process from which the raw material for aliphatic $C_5$ hydrocarbon resins comes. These crude $C_5$ fractions consist of olefins and diolefins including isoamylene, isoprene, piperylene and cyclopentadiene. Cyclopentadiene undergoes dimerization to dicyclopentadiene ($C_{10}$) by a Diels-Alder reaction even at room temperature. Cyclopentadiene is an undesirable component and is heat-soaked to dimerize to DCPD. This then is one basis for the production of DCPD based resins.

While $C_9$ feedstreams are also a source of dicyclopentadiene, there are fewer facilities that offer these C₉ resin oils for resin manufacturing. Further, the Applicants surmise that if other feedstreams were available to produce substantially aliphatic resins having a relatively high Tg, such monomers would also be suitable for use for polymerizing resins for use in adhesive compositions having the desired improved properties.

The resins useful to the present invention are substantially aliphatic in nature, whether linear aliphatic or cycloaliphatic in character. Generally, the level of aromaticity will be less than about 10% by weight of the tackifying resin, preferably less than about 5% by weight and most preferably less than about 3% by weight. It is surmised that the aromaticity changes the compatibility of the tackifying resin with various other ingredients that are used in hot melt adhesives.

The resins of the present invention preferably contain a high weight percent (based on the weight of the resin) of component(s) derived from dicyclopentadiene, although some resins having a lower concentration of the total unit derived from dicyclopentadiene have also been found to be useful. One such resin is Eastotac® H-142R having a bromine number of about 5 and a softening point of about 140° C. and available from Eastman Chemical Co. in Kingsport, Tenn. The Eastotac® resins are produced from a mixed feedstream of dicyclopentadiene, C₅'s and other monomers. The Eastotac® resins are typically described as cycloaliphatic resins.

Depending on the selection of polymer, the preferred tackifying resin may comprise greater than 50% by weight, preferably greater than about 80% by weight, more preferably greater than about 85% by weight and most preferably greater than about 90% by weight of the total resin derived from DCPD. For example, the Applicants have found that Eastotac® H-142 is useful in ethylene vinyl acetate compositions but is less preferred for APAO based adhesives. Higher DCPD concentrations are preferred for use with ethylene copolymers where the resin content is less than or equal, and more preferably less than, the total polymer content. The Applicants surmise that the compatibility of the higher DCPD content resins is better with the ethylene copolymers than with other polymer types.

The resin also preferably has a low level of unsaturation. The level of unsaturation relates inversely to the extent of hydrogenation and for tackifying resins is indicated by the bromine number, i.e., the halogen addition to double bonds. Bromine acceptance is measured using test method ASTM D 1159-84, DIN 51 774, an electrometric dead-stop method. The number is defined as the amount of bromine in grams accepted by 100 g of the test material that, in this case, is the tackifying resin. As the bromine number decreases, the level of hydrogenation increases and the tackifying resin becomes lighter in color as measured on the Molten Gardner Scale. The amount of unsaturation may be controlled by the process that is used to produce the resins as well as hydrogenation after the fact. The resins preferred in the present invention are light amber to water white in color, having a bromine number of preferably less than about 15 grams/100 grams, more preferably less than about 10 g/100 g, even more preferably less than about 5 g/100 g, even more preferably less than about 3 g/100 g and most preferably less than about 1 g/100 g. The Gardner color of the resin is preferably less than 3 and more preferably less than 2 and most preferably from less than about 1 to about 2. Gardner colors can be less than 1 but not 0 because 0 is not a reportable number on the Gardner Scale.

The tackifying resins of the present invention preferably have number average molecular weights ($M_N$), as measured against styrene standards, from about 400 g/mole to about 800 g/mole and preferably from about 500 g/mole to about 700 g/mole. The weight average molecular weight as measured against styrene standards is preferably from about 700 to about 1200 g/mole ($M_W$) and the Z average molecular weight ($M_Z$) is from about 1600 g/mole to about 2500 g/mole.

The resins for use in the invention are available from several sources including the Exxon Chemical Co. in Houston, Tex., Hercules, Inc. in Wilmington, Del. and Eastman Chemical Co. in Kingsport, Tenn. DCPD resins are also available from Nippon Zeon of Japan. Specific examples include ECR-158, a substantially aliphatic hydrocarbon resin having a $T_g$ at onset of about 81° C. and Escorez® 5340, a substantially aliphatic hydrocarbon resin having a $T_g$ at onset of about 76° C. both available from Exxon Chemical Co.; Regalite® T-140, a substantially aliphatic hydrocarbon resin having a $T_g$ at onset of about 68° C.; Eastotac® H-135, a substantially aliphatic hydrocarbon resin having a $T_g$ at onset of about 73° C. and Eastotac® H-142, a substantially aliphatic (i.e. cycloaliphatic) hydrocarbon resin having a $T_g$ at onset of about 82° C.

In general, the resin is useful at concentrations ranging from about 10 wt-% to about 80 wt-%, preferably from about 15 wt-% to about 70 wt-%, and more preferably from about 20 wt-% to about 60 wt-% of the adhesive composition. However, the preferred concentration of tackifying resin depends on the polymer employed, and thus, changes depending on which polymer is selected. For instance, when the thermoplastic polymer is an ethylene copolymer, the high Tg resin is useful from about 10 wt-% to about 50 wt-%, preferably from about 15 wt-% to about 45 wt-% and even more preferably from about 20 wt-% to about 40 wt-% of the total adhesive composition.

The adhesive composition of the present invention contains at least one thermoplastic polymer. The polymers useful herein include homopolymers, copolymers and terpolymers of ethylene; amorphous polyalphaolefins, rubbery block copolymers and homogeneous ethylene/α-olefin interpolymers. In general, the thermoplastic polymer is present in the adhesive composition in an amount ranging from about 10 wt-% to about 80 wt-%, preferably from about 20 wt-% to about 60 wt-% and most preferably from about 20 wt-% to about 50 wt-% of the composition. However, when the thermoplastic polymer is an amorphous polyalphaolefin, it is preferred to use higher amounts of the thermoplastic polymer. Further, when the polymer is a copolymer of ethylene or a rubbery block copolymer, it is preferable to utilize less than about 50 wt-% and preferably less than about 40 wt-% of the thermoplastic polymer.

Copolymers and terpolymers of ethylene are polymers having at least one comonomer selected from the group consisting of vinyl esters of a saturated carboxylic acid wherein the acid moiety has up to 4 carbon atoms, unsaturated mono- or dicarboxylic acids of 3 to 5 carbon atoms, a salt of the unsaturated acid, esters of the unsaturated acid derived from an alcohol having 1 to 8 carbon atoms, and mixtures thereof.

Copolymers and terpolymers of ethylene generally range in comonomer content from about 15 wt-% to about 40 wt-% and range in melt index from about 3 g/10 mins to about 2500 g/10 mins. In the present invention, it is preferred that the copolymer/terpolymer of ethylene have a comonomer content from about 18 wt-% to about 35 wt-% and preferably from about 18 wt-% to about 33 wt-%. Further, in order to maintain a low viscosity at relatively low application temperatures, the melt index (single polymer or blend) preferably ranges from about 5 to about 1000 g/10 mins, and more preferably from about 20 to about 800 g/10 mins.

Preferred ethylene/unsaturated carboxylic acid, salt and ester interpolymers include ethylene/vinyl acetate (EVA) ethylene/acrylic acid (EEA) and its ionomers; ethylene/methacrylic acid and its ionomers; ethylene/methyl acrylate (EMA); ethylene/n-butyl acrylate (EnBA); as well as various derivatives thereof that incorporate two or more comonomers.

Commercial examples of useful polymers include ethylene homopolymers available from Eastman Chemical Co. under the tradename of Epolene®; ethylene vinyl acetate copolymers available from Du Pont de Nemours & Co. in Wilmington, Del. under the tradename of Elvax® and from Millenium Petrochemicals in Rolling Meadows, Ill. under the tradename of Ultrathene®; ethylene n-butyl acrylate copolymers available from Exxon Chemical Co. under the tradename of Escorene®, from Elf Atochem North America in Philadelphia, Pa. under the tradename of Lotryl® and from Millenium Petrochemicals under the tradename of Enathene®; ethylene methyl acrylate copolymers from Exxon Chemical Co. under the tradename of Optema®; and ethylene n-butyl acrylate carbon monoxide terpolymers from Du Pont under the tradename of Elvaloy®.

For copolymers and terpolymers of ethylene, it is surmised that the resin utilized may have lower levels of the total resin unit being derived from DCPD and still be compatible with these polymers. The copolymers and terpolymers of ethylene are useful from about 10 wt-% to about 60 wt-%, preferably from about 20 wt-% to about 60 wt-% and most preferably from about 20 wt-% to about 50 wt-%.

In a preferred embodiment of the present invention, about 40 wt-% of an ethylene vinyl acetate copolymer having about 28% vinyl acetate by weight of the copolymer and a melt index of about 400 g/10 minutes is used. The programmed oven peel values are preferably greater than about 60° C. The composition has a tackifying resin concentration of 40 wt-%.

In another preferred embodiment, 40 wt-% of an ethylene copolymer is utilized with 30 wt-% of a tackifying resin having greater than about 80 wt-% of its unit derived from dicyclopentadiene and 30 wt-% of a synthetic wax having a melting point of greater than about 80° C.

Amorphous polyolefins or amorphous polyalphaolefins (APAO) are homopolymers, copolymers, and terpolymers of $C_2$–$C_8$ alphaolefins. Such polymers have varying degrees of crystallinity and are not necessarily atactic. These materials are typically polymerized by means of processes which employ Ziegler-Natta catalysts resulting in a relatively broad molecular weight distribution. Commercially available amorphous polyalphaolefins include Rextac® and REX-Flex® propylene based homopolymers, ethylene-propylene copolymers and butene-propylene copolymers available from Rexene (Dallas, Tex.) as well as Vestoplast® alpha-olefin copolymers available from Hüls (Piscataway, N.J.). Further, homopolymers, copolymers and terpolymers of propylene are available from Eastman Chemical Co. under the tradename of Eastoflex®.

When employing an amorphous polyalphaolefin as the base polymer in the adhesive, the tackifying resin preferably has a $T_g$ of greater than about 75° C. and preferably greater than about 80° C. as measured at onset, and has greater than about 80 wt-% of the total resin unit derived from dicyclopentadiene, preferably greater than about 85 wt-% and most preferably greater than about 90 wt-%. One such resin is available from Exxon Chemical Co. in Houston, Tex. and has a $T_g$ of greater than about 81° C. This $T_g$ has also been reportedly as high as 88° C. there again depending on the temperature used on the DMA curve.

In other preferred embodiments, homopolymers and copolymers of propylene having varying amounts of crystallinity are used. Surprisingly, high heat resistance, as measured by programmed oven peel values, has been achieved with the use of these (atactic) polypropylenes. The programmed oven peels are preferably greater than about 65° C., more preferably greater than about 70° C. and most preferably greater than about 75° C. It is surmised that the DCPD based tackifying resins having a higher percentage of the total resin unit, greater than about 80 wt-%, preferably greater than about 85 wt-% and most preferably greater than about 90 wt-%, derived from DCPD, are more compatible with these resins therefore achieving higher heat resistance. It is further surmised that the high $T_g$ of the resin also contributes to the very high peel values obtained. Without this combination, high peel values were not obtained with the homopolymers and copolymers of propylene.

The rubbery block copolymers include those polymers having the general configuration A-B diblock, A-B-A triblock, A-B-A-B-A-B multiblock, radial block copolymers, Y-block copolymers and star polymers. Commonly, the A block is styrene and the B block may be butadiene, isoprene, ethylene/butylene and ethylene/propylene although there are others as well. Examples of useful rubber block copolymers include the Kraton® G series of styrene-ethylene/butylene-styrene block copolymers, the Kraton® block copolymers, the Kraton® D series of styrene-butadiene-styrene block copolymers both from Shell Chemical Co. in Houston, Tex.; Vector® styrene-isoprene-styrene and styrene-butadiene-styrene block copolymers from Dexco Chemical Co. and Septon® styrene-ethylene/propylene-styrene block copolymers from Kuraray Ltd. in Tokyo, Japan. Block copolymers are available in many different configurations, with varying amounts of endblock and midblock, various coupling efficiencies (i.e., A-B diblock/A-B-A triblock ratios) and various molecular weights. The choices vary depending on the end use, the application equipment and the physical requirements of both.

When employing a block copolymer as the base polymer of the adhesive, or a combination of a block copolymer and a copolymer or interpolymer of ethylene, preferably the majority of the total resin unit is derived from dicyclopentadiene. In such instances, the tackifying resin preferably has greater than 80 wt-% of its total unit derived from dicyclopentadiene, more preferably greater than about 85% and most preferably greater than about 90 wt-%. One preferable resin is Escorez® 5340, a DCPD based hydrocarbon tackifying resin having a $T_g$ at onset of greater than about 75° C., available from the Exxon Chemical Co. in Houston, Tex. Another preferable resin is also DCPD based but has a $T_g$ of greater than about 80° C. and is available from Exxon Chemical Co. under the tradename of ECR-158.

In a preferred embodiment, 20 wt-% of an interpolymer of ethylene, 20 wt-% of a block copolymer, about 40 wt-% of a tackifying resin and about 20 wt-% of a synthetic high melting point wax is used. The peel values obtained in this case are far superior being greater than about 75° C. These are extremely high peel values compared to standard hot melt adhesives that have been commercially available to date. It appears to be advantageous to minimize the resin concentration.

Homogeneous ethylene/α-olefin interpolymers are homogeneous linear or substantially linear interpolymers of ethylene and at least one $C_3$ to $C_{20}$ alphaolefin. Homogeneous ethylene/α-olefin interpolymers are prepared using metallocene or constrained geometry catalysts. The interpolymers are further characterized as having a polydispersity of less than about 2.5 and densities of less than about 0.915. Preferably, the interpolymer has a relatively low density, ranging from about 0.855 g/cm³ to about 0.885 g/cm³. Useful comonomers include butene (1-butene), hexene (1-hexene), isobutylene, 4-methyl-1-pentene, 1-octene, propene and styrene and mixtures thereof. Specific examples of homogeneous linear interpolymers include Exact® 5008, an ethylene-butene copolymer, Exxpol® SLP-0394, an ethylene-propylene copolymer and Exact® 3031, and ethylene-hexene copolymer all available from Exxon Chemical Company, whereas substantially linear ethylene interpolymers are available under the tradenames of Affinity®, Insight® and Engage® from Dow Chemical Company in Midland, Mich. including ethylene-1-octene copolymers.

Waxes are useful in any combination from 0% by weight to about 40% by weight of the hot melt composition, preferably from about 15% by weight to about 35% by weight and most preferably from about 20% by weight to about 30% by weight of the hot melt composition. At higher wax levels, bondability of the adhesive system may be affected. At lower levels, the adhesive may set too slowly or heat resistance may adversely be affected. In a preferred embodiment, all synthetic high melting point wax is utilized. When the thermoplastic polymer is an ethylene copolymer, it is preferable to use from about 10% by weight to about 30% by weight of the composition. When the thermoplastic polymer is a homopolymer or copolymer of propylene it may be preferable to use less wax, for example, less than about 10 wt-%, or no wax at all, as it changes the compatibility of the system. Compatibility refers generally to a lack of phase separation in the system. A system that is not completely compatible may be cloudy, showing some phase separation and has a different rheology. Preferably, synthetic high melting point waxes, paraffin waxes and/or microcrystalline waxes are employed.

The synthetic high melting point waxes include high density, low molecular weight polyethylene waxes and Fischer-Tropsch waxes that are made by the Fischer-Tropsch process. Many of the polyethylene waxes are produced as a by-product of the steamcracking process used in the petroleum industry to obtain such things as ethylene and propene. These waxes typically have a weight average molecular weight of less than about 2500 grams/mole and preferably less than about 1500 g/mole although these numbers may be higher or lower. The melting points are generally greater than about 90° C. and even more commonly greater than about 100° C. Examples of useful synthetic high melting point waxes include Bareco® PX-100, a Fischer-Tropsch Wax produced by Shell, Malaysia; Polywax® 1000, 2000 and 3000, low molecular weight, high density polyethylene waxes available from Petrolite Corp. in Tulsa, Okla.; Escomer® H-101, a modified polyethylene wax available from Exxon Chemical Co. in Houston, Tex.; Marcus® 100, 200 and 300, high density, low molecular weight polyethylene produced as a by-product of steamcracking of petroleum available from Marcus Chemical Co., a division of H.R.D. Corp. in Houston, Tex.; Paraflint® HL, H-1, H-4 and H-8, Fischer-Tropsch waxes available from Sasol-SA/Moore & Munger Marketing in Shelton, Conn.; and C-80, a lower melting point synthetic wax produced by the Fischer-Tropsch process (i.e., melting point of about 80° C.) available from Sasol-SA/Moore & Munger.

The paraffin waxes useful herein are those having a Ring & Ball softening point of about 55° C. to about 85° C., and preferably those having a melting point of about 70° C. Examples of these waxes include Okerin® 236TP available from Astor Wax Corp. in Doraville, Ga.; Penreco® 4913 from Pennzoil Product Co. in Houston, Tex.; R-7152 Paraffin Wax from Moore & Munger and Paraffin Wax 1297 from International Waxes LTD in Ontario, CAN. The microcrystalline waxes useful herein are those having about 50% by weight or more cyclo or branched alkanes with a length of between about 30 and 100 carbons. They are generally less crystalline than paraffin and polyethylene waxes due to the branching and have melting points of greater than about 70° C. Examples include Victory® Amber Wax, a 70° C. melting point wax available from Petrolite Corp.; Bareco® EX-796 Amber Wax, a 70° C. melting point wax from Bareco in Chicago, Ill.; Okerin® 177, an 80° C. melting point wax available from Astor Wax Corp.; Be Square® 195 Amber Wax, a 90° C. melting point wax from Industrial Raw Materials in Smethport, Pa. and Petrowax® 9508 Light, a 90° C. melting point wax from Petrowax Pa., Inc. in New York, N.Y.

In addition to the essential high Tg tackifying resin, optionally, other tackifying resins may be utilized in the present invention. In such instances, the high Tg resin is typically present at a concentration of at least 20 wt-% of the adhesive composition. Useful tackifying resins include terpenes and modified terpenes (i.e., styrenated terpenes); rosins and rosin esters; aliphatic, cycloaliphatic and aromatic hydrocarbons; and mixtures thereof. Hydrocarbon resins may have any mixture of aliphatic, cycloaliphatic and aromatic character or they may be purely aliphatic or purely aromatic. There are many different levels of hydrogenation, also referred to as the level of saturation which generally refers to how many double bonds have been reduced to single bonds by hydrogenation, for each type of resin produced. Hydrogenation generally lightens the color of the resin but also increases the cost. The level of hydrogenation of a tackifying resin, as discussed above, is generally measured by bromine number.

Commercial examples include Escorez 5615, a hydrogenated aromatic modified hydrocarbon resin having a softening point of 115° C. from Exxon Chemical Company (Houston, Tex.); Eastotac H-100 and H-130 (Tg of about 65° C.) a 100° C. and 130° C., respectively, softening point cycloaliphatic hydrocarbon resins from Eastman Chemical Co. (Kingsport, Tenn.) and Escorez 5380, a hydrogenated hydrocarbon resin having a softening point of 80° C. from Exxon Chemical Company (Houston, Tex.).

For tackifying resins having glass transition temperatures of less than about 25° C., it is preferable to utilize concentrations of equal to or less than the concentration of the tackifying resins of the present invention which have the very high $T_g$'s.

Optionally, an oil or plasticizer may be utilized in the present invention provided that it does not adversely affect the heat resistance. These include paraffinic and naphthenic process oils, mineral oils, liquid elastomers including polybutenes and polyisobutylenes, liquid benzoate plasticizers and solid benzoate plasticizers to mention only a few.

The solid benzoate plasticizers have been found to further enhance heat resistance, cold temperature flexibility and adhesion in some systems. These solid plasticizers are useful from about 0 wt-% to about 40 wt-%. In some systems it may be preferable to utilize the solid plasticizer from about 10 wt-% to about 30 wt-%.

A stabilizer or antioxidant is also preferably used in hot melt adhesives. These compounds are added to protect the adhesive from degradation caused by reaction with oxygen induced by such things as heat, light or residual catalyst from the raw materials such as the tackifying resin. Such antioxidants are commercially available from Ciba-Geigy in Hawthorne, N.Y. and include Irganox® 565, 1010 and 1076 that are hindered phenols. These are primary antioxidants that act as radical scavengers and may be used alone or in combination with other antioxidants such as phosphite antioxidants like Irgafos® 168 available from Ciba-Geigy. Phosphite antioxidants are considered to be secondary antioxidants and are generally not used alone. These are primarily used as peroxide decomposers. Other available antioxidants are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties.

Other compounds that could be added that do not affect physical properties are pigments which add color, fluorescing agents, UV absorbers and odor masks. Of particular importance to the adhesives of the present invention are pigments including titanium dioxide that adds whiteness to a product. This can be important to the aesthetics of a finished article. Additives like these are generally added in small amounts of less than 5% by weight of the composition, more typically even less than about 2% by weight of the composition and are known to those skilled in the art.

The compositions of the present invention are also useful as flame retardant adhesives upon the addition of inorganic flame retardant fillers such as hydrated inorganic compounds or halogenated compounds. These compounds are added in much higher concentrations, as high as 40% or 50% by weight, than when using inorganic fillers for color such as titanium dioxide for whiteness. The compositions of the present invention are useful as flame retardant adhesives due to the high heat resistance.

These adhesives can be prepared using either high shear sigma blade mixers, extruders or upright mixers. Temperatures are generally kept between about 150° C. and about 190° C.

These adhesives can be applied using any standard hot melt application techniques including contact and non-contact methods. Such application methods include extrusion, wheel application, roll coating, gravure coating, slot die coating, fiberization, spiral spray, filament and so forth.

The resultant compositions have peel values of greater than about 60° C. (about 140° F.), preferably greater than about 63° C. (about 145° F.), more preferably greater than about 65° C. (about 150° F.), even more preferably greater than about 67° C. (about 153° F.), even more preferably greater than about 68° C. (about 155° F.), even more preferably greater than about 70° C. (about 158° F.), even more preferably greater than about 73° C. (about 163° F.) and most preferably greater than about 75° C. (about 167° F.). If the composition comprises a homopolymer or copolymer of propylene, or a rubbery block copolymer including blends of polymers with rubbery block copolymers, the peel values obtained have been found to be higher. Peel values in these instances are greater than about 67° C., more preferably greater than about 68° C., even more preferably greater than about 70° C., even more preferably greater than about 73° C. and most preferably greater than about 75° C.

The viscosities are preferably less than about 10,000 cPs at about 175° C., more preferably less than about 5000 cPs, even more preferably less than about 3500 cPs and most preferably less than about 2000 cPs at about 175° C. If the application is for structural types of applications, including wood working, construction, automotive, durable goods, insulation and so forth, the viscosities may be substantially higher, even greater than about 20,000 cPs and still even greater than about 50,000 cPs. If the application is for bookbinding, for instance, preferably the viscosity is optimally about 4000 cPs to about 10,000 cPs. For packaging applications, the viscosities are preferably less than about 2000 cPs, more preferably less than about 1500 cPs and most preferably less than about 1000 cPs at about 177° C. For low melting point applications, the application temperature is lower at less than about 150° C. and more preferably less than about 135° C. In these instances, the viscosity will be adjusted downward accordingly. Further, the cloud points may be as low as about 110° C.–125° C.

The cold temperature resistance and flexibility of these systems is found to be superior to more conventional compositions. Cold crack values may be measured to determine cold temperature resistance as well as bonding results at the cold temperatures. Preferably, the adhesives will have good bonding down to about −40° C. and preferably excellent bonding down to temperatures as low as about −40° C. Cold crack values are preferably less than about 0° C.

The adhesive compositions are useful for a wide variety of applications including case and carton sealing, tray forming, heat sealing applications, carpet sealing, heat sealing and bag end sealing, insulation, bonding filter media, insulation bonding, durable goods manufacturing including shoes and other athletic gear, wood working, construction, automotive applications and so forth. The compositions are also ideally suited for all types of bookbinding applications including one shot and two shot perfect binding, The following non-limiting examples further illustrate the compositions of the present invention.

EXAMPLES

The adhesives were prepared using an upright or lightening mixer. The tackifying resin and wax are generally melted first and the thermoplastic polymer is then added to the tackifier/wax blend and mixed until smooth. The temperature for melting and mixing is held from about 300° C. to about 375° C. Antioxidant, or any other additive, may be added in the tackifier/wax blend, after polymer addition or some at each stage.

Test Methods

1. Melt Viscosities

The melt viscosities of the hot melt adhesives were determined on a Brookfield Thermosel Viscometer Model LVDV 2+using a number 21 spindle. The temperature utilized was about 150° C. (about 300° F.).

2. Peel and Shear

Peel and shear values were determined by placing samples in a programmed oven with 100 g weights used for the peel mode and 500 g weights used for the shear mode, and ramping the temperature up from 25° C. to 100° C. at 25° C./hour. The oven automatically recorded the temperature at which the samples failed. Each sample was coated onto kraft paper by hand using glass rods or shims. The resultant coating is a one inch (2.5 cm) wide band that is about 8–10 mils (about 0.2–0.25 mm) or about 0.008 to about 0.010 inches (about 0.02 to about 0.03 cm) thick. Four to five bonds were made for the peel mode and four to five bonds were made for the shear mode and the results were averaged.

3. Bonding Tests

Adhesive bonds were made on various substrates using an application temperature of about 150° C., an open time of 1 second, a set time of 1 second, and a bead size of 1/16 inch (0.16 cm) for the chipboard type substrates and ⅛ inch (0.32 cm) for the corrugated substrates. The resulting bonds were then conditioned for at least 24 hours at the different test temperatures, and then separated by hand and the amount of fiber tear was determined. A minimum of three samples were tested for each adhesive at each of the different temperatures and the adhesives were then rated using a system of poor, good or excellent. Poor bonds were those where a small amount or no fiber tear was observed, good bonds showed roughly half or more fiber tear and excellent bonds showed greater than about 75% to full fiber tear.

4. Cold Crack

Prepare several 1 inch by 3 inch (2.5 cm by 7.6 cm) adhesive films free of air bubbles that are 20–30 mils (0.5–0.7 mm) in thickness. Place three films individually over the v-shaped base of a cold crack apparatus that consists of a stand with an interlocking pressure bar. The stand is 3 inches (7.6 cm) by 0.75 inch (1.9 cm) wide and 12 inches (30 cm) long. A 90° angle is cut squarely ½ inch (1.3 cm) deep into the top surface. Place the pressure bar, which is also cut at a 90° angle, into the gap of the stand. This test is repeated lowering the temperature at 5° F. (15° C.) increments with a new film sample for each temperature until the film cracks. The recorded "Cold Crack" is an average of at least 2 samples.

5. Ultimate Tensile & Elongation, Yield Point and Young's Modulus

Tensile and elongation, Young's Modulus and Yield Point are determined using ASTM D-638. The die used is an ASTM D-638 Type 4 die. A one inch gauge with a video extensometer is used to monitor elongation. Strain rate is between about 20 inches/minute (about 51 cm/min) and about 25 inches/minute (about 64 cm/min) (20.5 inches/minute (52.1 cm/min) for these examples). Prepare a 20–30 mil (0.5–0.7 mm) thick adhesive film free of air bubbles on a polytetrafluoroethylene or aluminum sheet. Cut 7 dog-bones lengthwise from the film measuring the thickness at the gauge section. Condition the samples for at least 24 hours at 21° C. and 23 to 50 percent relative humidity. Place each sample in the jaws of an Instron tensile tester or equivalent with a load cell capable of measuring up to about 2000–2500 psi. Elongate samples at a 10 inches/minute (25.4 cm/min) crosshead speed until break. Record the "Ultimate Tensile" at yield by dividing the maximum force by the cross-section area of the sample and "percent Elongation" by dividing the displacement at break by the sample length and multiply by 100. The resistance to tensile deformation is generally measured as small strains. The "Ultimate Tensile" and "percent Elongation" are an average of at least five samples. Young's modulus is a method of ranking the relative flexibility of adhesive films.

6. Glass Transition Temperature, $T_g$ Differential Scanning Calorimetry

The instrument utilized is a Perkin-Elmer DSC-7 Robot with Software. Guidance may be obtained from ASTM D-3418-83: Transition Temperatures of Polymers by Thermal Analysis. The glass transition temperature is determined by differential scanning calorimetry. Sample size is from about 10 to about 15 mg. The sample size utilized here was more precisely from about 12 mg to about 13.5 mg. The samples were conditioned at 140° C. for 5 minutes, quench cooled to −65° C., then heated to 140° C. at a rate of 20° C./minute. The samples exhibited two glass transition temperatures. It is the onset temperature that is reported herein.

7. Mettler Ring and Ball Softening Point

ASTM Method D-3461.

8. Set Temperature and Open Temperature

The gradient bar method was used to determine open/waxy and waxy/set temperatures. The gradient bar is set and equilibrated for 1 hour. A molten line of adhesive which is approximately ¼ inch wide (0.6 cm) was poured down the center of the gradient bar. A strip of Kraft paper which is approximately 2 inches by 14 inches (5 cm×35.6 cm) was placed on top of the adhesive line and a 4.5 pound (2.0 kg) PSA roller was passed over the top of the Kraft paper twice in order to assure that the system is sufficiently wet out. This laminate is then allowed to dwell for 3 minutes at which time the Kraft paper is peeled starting from the hottest end of the gradient bar and pulling slowly to the coolest end. Transition temperatures are determined using a digital thermometer (pyrometer) which has a surface probe. Temperatures are recorded on the metal surface of the gradient bar. The set/waxy temperature is the point at which the tear line for the paper crosses the entire adhesive line. Once the set temperature has been determined, the open/waxy temperature may be determined. After the 2 inch by 14 inch (5 cm×35.6 cm) of Kraft paper has been torn from the adhesive line, ⅛ inch to ¼ inch by 2 inch strips of paper (0.3 cm to 0.6 cm×5 cm) were placed down on the gradient bar over the open/waxy region. The paper strips were then removed from the low temperature end until a piece with adhesive wetting out the paper was found, designating the open/waxy transition temperature.

9. Cloud Point

This procedure is utilized to measure the compatibility of molten blends. A test tube of approximately 25×150 mm (Pyrex) is filled approximately ¾ full of molten hot melt at a temperature of 176.7° C. (350° F.). The sample is carefully mixed with the thermometer to introduce as little air as possible. The temperature at which markings on the thermometer, when pressed against the opposite wall of the test tube, are no longer visible is recorded.

Example 1

This example illustrates a composition useful for packaging applications. A sample was prepared using a blend of 20% by weight Bareco® PX-100 Fischer Tropsch Wax, 40% ECR-158, a substantially aliphatic hydrocarbon resin having most of its total unit weight derived from DCPD, a glass transition temperature of about 81° C. onset temperature and molecular weight $M_Z$ of about 2200 g/mole, $M_N$ of about 800 g/mole and $M_W$ of about 500 g/mole, 40% by weight of an ethylene vinyl acetate copolymer having 28% vinyl acetate by weight of the copolymer and a melt index of about 400 g/10 minutes and 0.3% Irganox® 1010 antioxidant available from Ciba-Geigy. The samples were prepared as described above. The resultant mixture exhibited programmed 100 g oven peels of about 69° C. (156° F.) and a water white color.

Example 2

A hot melt adhesive composition was prepared utilizing a blend of 30 wt-% ECR-158, a hydrocarbon resin available from Exxon Chemical Co., 30 wt-% of a synthetic high melting point wax having a melting point of greater than about 100° C. and 40% of an ethylene vinyl acetate copolymer having a melt index of 400 g/10 minutes and a vinyl acetate content of 28%. The resultant composition exhibited 10 g oven peels of 60° C., a viscosity of 1070 cPs and corrugated bonds at about 17.7° C. (0° F.) having about 80% fiber tear.

Examples 3 And 4

Example 3 was prepared using a blend of 40% by weight of an ethylene vinyl acetate copolymer with a vinyl acetate content of 28% and a melt index of 400 g/10 minutes, 14.7% by weight of Escorez 5615 hydrocarbon resin, 14.8% by weight ECR 158 hydrocarbon resin (high $T_g$) and 29.8% by weight Bareco C-4040 synthetic high melting point wax and 0.7% of a hindered phenolic antioxidant. The following physical properties were exhibited.

Example 4 was prepared using a blend of 45% by weight of an EVA with 28% vinyl acetate and a melt index of 800 g/10 minutes, 34.7% ECR 158, 19.8% Bareco C-4040 and 0.7% hindered phenolic antioxidant.

TABLE I

| Physical Properties | Example 3 | Example 4 |
| --- | --- | --- |
| Viscosity @ 176.7° C. (350° F.) | 990 | 1010 |
| Mettler R & B Soft. Point (° C.) | 105 | 118 |
| 100 g Peels (° C.) | 67 | 68 |
| 500 g Shears (° C.) | 94 | 92 |
| Cloud Point (° C.) | 38 | 37 |
| Open Temperature (° C.) | 91 | 89 |
| Set Temperature (° C.) | 69.5 | 72 |
| Specific Gravity | 0.965 | 0.968 |

Example 5

This example illustrates a composition useful for bookbinding. A sample was prepared by blending a sample of 20% by weight of an interpolymer of ethylene/1-octene having a melt index of 1000 g/10 minutes and a density of 0.87 g/cm³ available from the Dow Chemical Co. in Freeport, Tex.; 20% by weight Kraton® G 1730, a styrene-ethylene/propylene-styrene-ethylene/propylene block copolymer available from Shell Chemical Co. in Houston, Tex.; 39.5% by weight ECR-158 hydrocarbon resin from Exxon Chemical Co., a molecular weight, $M_Z$, of about 2200 g/mole, $M_N$ of about 500 g/mole and $M_W$ of about 800 g/mole relative to polystyrene standards; 20% by weight Bareco® PX-100, a high melting point synthetic resin and 0.5% by weight Irganox® 1076 hindered phenolic antioxidant. The following data was obtained:

TABLE II

| Physical Properties | Example 5 |
| --- | --- |
| Viscosity @ ~177° C. (cPs) | 4,465 |
| Programmed 100 g oven peel (° C.) | 77 |
| Cold Crack (° C.) | −1 |
| Ambient range (100 g peel-cold crack) (° C.) | 61 |
| Ultimate Tensile (psi) | 1,021 (~72 kg/cm²) |
| Yield Point (psi) | 310 (~22 kg/cm²) |
| Elongation at Break (%) | 690 |

Examples 6–7 AND COMPARATIVE EXAMPLES A–E

TABLE III

| Ingredients | Ex 6 | Comp A | Comp B | Ex 7 | Comp C | Comp D | Comp E |
|---|---|---|---|---|---|---|---|
| Rextac ® RT2180 | 70 | 70 | 70 | — | — | — | — |
| Rextac ® RT2280 | — | — | — | 70 | 70 | 70 | 70 |
| Benzoflex ® 352 | 10 | 10 | 10 | 10 | 10 | 10 | 10 |
| ECR-158 resin ($T_g = 81°$ C.) | 20 | — | — | 20 | — | — | — |
| Eastotac ® H-130 Resin ($T_g = 65°$ C.) | — | 20 | — | — | 20 | — | — |
| Eastotac ® H-100 Resin ($T_g = 30°$ C.) | — | — | 20 | — | — | 20 | — |
| Escorez ® 5615 Resin ($T_g = 59°$ C.) | — | — | — | — | — | — | 20 |
| 100 g Peels (° C.) | 81 | 66 | 58 | 87 | 57 | 52 | 32 |

All of the resins listed in the table are substantially aliphatic hydrocarbon resin. They are all derived at least in part from DCPD. Table III illustrates the use of a dicyclopentadiene based tackifying resin having a high $T_g$ that improves a hot melt adhesive based on homopolymers and copolymers of propylene. RT 2180 is a 157° C. softening point, 8000 mpas viscosity propylene homopolymer; whereas RT 2280 is a 146° C. softening point, 8000 mpas viscosity low ethylene-propylene copolymer. Eastotac® H-100 and H-130 and Escorez® 5615 were used for comparative purposes to illustrate that aliphatic resins (i.e., DCPD) having low $T_g$'s did not find utility to the present invention.

Examples 8–10 AND COMPARATIVE EXAMPLES F–G

TABLE IV

| Ingredients | Ex 8 | Comp F | Ex 9 | Ex 10 | Comp G |
|---|---|---|---|---|---|
| Rextac ® RT2280 | 80 | 80 | — | — | — |
| Rextac ® RT2180 | — | — | 60 | 60 | 60 |
| Benzoflex ® 352 Solid plasticizer | 10 | 10 | 10 | 10 | 10 |
| ECR-158 resin ($T_g = 81°$ C.) | 10 | — | — | 30 | — |
| Regalite ® T 140 Resin ($T_g = 68°$ C.) | — | — | 30 | — | — |
| Eastotac ® H-130 Resin ($T_g = 65°$ C.) | — | 10 | — | — | 30 |
| 100 g Peels (° C.) | 77 | 62 | 68 | 76 | 60 |

Table IV also illustrates the use of the DCPD based resins having a high $T_g$ in improving the peel values of hot melt adhesives based on homopolymers and copolymers of propylene. Eastotac® H-130 was used for comparative purposes. The peel values produced with this resin were substantially lower in these APAO based systems than the same compositions using other tackifying resins.

Examples 11–13 AND COMPARATIVE EXAMPLES H–I

TABLE V

| Ingredients | Ex 11 | Ex 12 | Comp H | Comp I | Ex 13 |
|---|---|---|---|---|---|
| Bareco ® PX-100 F/T Synth Wax | 20 | 20 | 20 | 20 | 20 |
| ECR-158 resin ($T_g$ 81° C.) | 40 | 26.7 | 13.3 | — | — |
| Escorez ® 5380 Resin ($T_g = 23°$ C.) | — | 13.3 | 26.7 | 40 | — |
| EVA (400 MI/28 wt-% vinyl acetate) | 40 | 40 | 40 | 40 | 40 |
| Regalite ® T-140 ($T_g = 68°$ C.) | — | — | — | — | 40 |
| 100 g Peels ° C. | 69 | 64 | 54 | 50 | 66 |

Table V illustrates the use of DCPD based resins having a high $T_g$ for use in hot melt adhesives based on ethylene copolymers, such as ethylene vinyl acetate. These peel values obtained with the EVA based systems were typically all lower than those based on the homopolymers and copolymers of propylene. Table V also illustrates that as the amount of a very low $T_g$ DCPD tackifying resins increases, the peel values decrease until the composition no longer has acceptable peel values (Comparative Ex I). As the amount of the high $T_g$ substantially aliphatic DCPD resin drops to 0 wt-%, the 100 g peel values fall even further to 50° C.

Example 13 is a further illustration of a substantially aliphatic DCPD resin that produces high peel values.

Examples 14–15

TABLE VI

| Ingredients | Example 14 | Example 15 |
|---|---|---|
| Bareco ® PX 100 Wax | 20 | 20 |
| Polymer A | 40 | 40 |
| ECR-158 ($T_g = 81°$ C.) | 40 | — |
| Regalite ® T-140 ($T_g = 68$) | — | 40 |
| 100 g Peels (° C.) | 64 | 62 |

Bonding Tests for Examples 14–15 (Table VII)

TABLE VII

| Bonding Tests | Example 14 | Example 15 |
| --- | --- | --- |
| @ −40° C. (−40° F.) | Excellent | Excellent |
| @ −29° C. (−20° F.) | Excellent | Excellent |
| @ −18° C. (0° F.) | Excellent | Excellent |
| @ 4.5° C. (40° F.) | Excellent | Excellent |
| @ 23° C. (73° F.) | Excellent | Excellent |
| @ 49° C. (120° F.) | Excellent | Excellent |
| @ 60° C. (140° F.) | Good | Excellent |

Examples 14 and 15 illustrate the use of DCPD resins having high $T_g$'s with homogeneous ethylene α/olefin interpolymers. Polymer A is a 0.870 g/cm³ density, 500 MI substantially linear ethylene-octene interpolymer. (The Dow Chemical Company)

The following experimental design was conducted with the ranges of ingredients found in the following table.

TABLE VIII

| Ingredient | Range (wt–%) |
| --- | --- |
| Escorez ® 5600<br>DCPD based hydrocarbon resin ($T_g$ = 47°) | 0–35 |
| Nirez ® V-2040<br>Terpene phenolic resin | 0–35 |
| ECR 158<br>DCPD based hydrocarbon resin ($T_g$ = 81°) | 0–35 |
| EVA (28% vinyl acetate and MI = 800 g/10 minutes) | 45 |
| Bareco C-4040<br>synthetic high melting wax | 20 |

The samples were prepared in a conventional manner utilizing an upright mixer at a temperature of about 150° C.–175° C. Tackifying resin and wax were premelted in a forced air oven set to a temperature of about 175° C. The samples were mixed until they were smooth and homogeneous.

Figure 1:
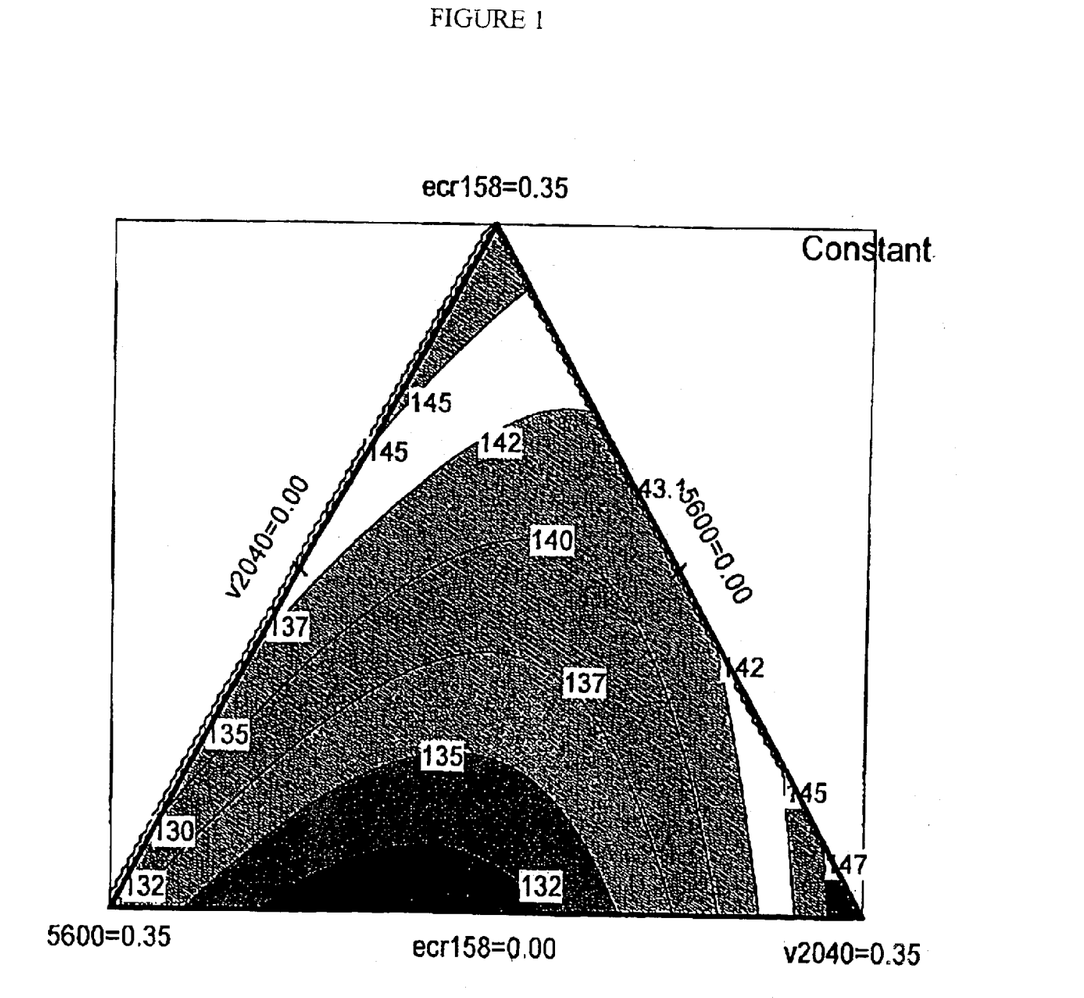
FIG. 1 is a contour plot generated from an experimental design illustrating the change in the peel value as the type of resin and its amount are varied from 0 wt-% to 35 wt-% of the total adhesive composition.

Samples were prepared according to the experimental design generated by computer and a contour plot as in FIG. 1 was generated.

FIG. 1 illustrates the effect on the peel value of each of the three tackifying resins while holding everything else, polymer and wax, constant.

Samples having high amounts up to 100% of the hydrocarbon resin having a $T_g$ of 47° C. produced the hot melt compositions with the lowest peel values. The terpene phenolic tackifying resin produced peel values as high as the hydrocarbon resin having a high $T_g$ but the samples were very brittle and had high cloud points indicating incompatibility. Blends having ECR 158 exhibited high peel values when mixed with one or both of the other resins.

This design illustrates the exceptional heat resistance obtained with the compositions of the present invention while maintaining flexibility.

What is claimed is:

1. A hot melt adhesive composition comprising:
   a) about 10% by weight to about 50% by weight of at least one substantially aliphatic tackifying resin having a glass transition temperature of greater than 65° C.
   b) about 20% by weight to about 60% by weight of at least one thermoplastic base polymer; and
   c) 0% by weight to about 40% by weight of at least one wax;
   wherein said tackifying resin concentration is less than said thermoplastic base polymer concentration.

2. The adhesive composition of claim 1 wherein said thermoplastic polymer is selected from the group consisting of copolymers and terpolymers of ethylene; amorphous polyalphaolefins; rubbery block copolymers; homogeneous ethylene/α-olefin interpolymers and mixtures thereof.

3. The adhesive of claim 1 wherein said composition comprises from about 15% by weight to about 40% by weight of said tackifying resin.

4. The adhesive composition of claim 1 wherein said tackifying resin has a melting point of greater than 140° C.

5. The adhesive of claim 1 wherein said tackifying resin has a $T_g$ of greater than about 68° C. (about 155° F.) at onset.

6. The adhesive of claim 1 wherein said tackifying resin has a $T_g$ of greater than about 70° C. at onset.

7. The adhesive of claim 1 wherein the tackifying resin has a Gardner Color of less than 3.

8. The adhesive of claim 1 wherein the tackifying resin has a Gardner Color of from about 1 to about 2.

9. The adhesive of claim 1 wherein said tackifying resin has a bromine value of less than about 5.

10. The adhesive of claim 1 wherein the tackifying resin has less than about 10% by weight aromatics.

11. The adhesive of claim 1 wherein the tackifying resin has less than about 5% by weight aromatics.

12. The adhesive of claim 1 comprising from about 10% by weight to about 40% by weight or at least one wax.

13. The adhesive of claim 1 wherein the wax is selected from the group consisting of synthetic waxes having a melting point of greater than about 80° C., microcrystalline waxes and paraffin waxes.

14. The adhesive of claim 1 wherein said at least one thermoplastic base polymer is a copolymer of ethylene, at least one comonomer of said copolymer being selected from the group consisting of vinyl acetate, n-butyl acrylate, methyl acrylate, vinyl caters and mixtures thereof.

15. The adhesive of claim 12 wherein said peel value is greater than about 14° F. (about 60° C.).

16. The adhesive of claim 1 wherein said peel value is greater than about 65° C.

17. The adhesive of claim 2 wherein said thermoplastic polymer is a homogeneous ethylene/α-olefin interpolymer.

18. The adhesive of claim 17 further comprising a block copolymer.

19. The adhesive of claim 18 wherein the peel values arc greater than about 70° C.

20. A hot melt adhesive composition comprising:
   a) about 10% by weight to about 50% by weight of at least one tackifying resin having a glass transition temperature of at least 65° C.;
   b) about 20% by weight to about 60% by weight of at least one thermoplastic base polymer selected from the group consisting of copolymers and terpolymers of ethylene; amorphous polyalphaolefins, homogenous ethylene/α-olefin interpolymer, and mixtures thereof; and
   c) 0% by weight to about 40% by weight of at least one wax;
   wherein said tackifying resin concentration is less than said thermoplastic base polymer concentration.

21. The composition of claim 20 wherein said composition comprises from about 10% by weight to about 45% by weight of said tackifying resin.

22. A hot melt adhesive composition comprising:
 a) about 10% by weight to about 50% by weight of at least one hydrocarbon tackifying resin derived, at least in part, from dicyclopentadiene and having a glass transition temperature of greater than about 65° C.;
 b) about 10% by weight to about 80% by weight of at least one thermoplastic base polymer selected from the group consisting of copolymers and terpolymers of ethylene; amorphous polyalphaolefins, homogenous ethylene/α-olefin interpolymer, and mixtures thereof.

23. The adhesive of claim 22 wherein said tackifying resin has a $T_g$ of greater than about 68° C. (about 155° F.).

24. The adhesive of claim 22 wherein greater than about 80 wt-% of the total resin unit is derived from dicyclopentadiene.

25. The adhesive of claim 22 wherein the tackifying resin is hydrogenated.

26. The adhesive of claim 22 further comprising up to about 40% by weight of a solid benzoate plasticizer.

27. The adhesive of claim 22 wherein the peel values are greater than about 70° C.

28. A hot melt adhesive comprising:
 a) from about 10% by weight to about 80% by weight of at least one aliphatic tackifying resin having a glass transition temperature ($T_g$) of greater than 65° C.; and
 b) from about 10% by weight to about 80% by weight of at least one thermoplastic base polymer selected from the group consisting of copolymers and terpolymers of ethylene; amorphous polyalphaolefins, homogenous ethylene/α-olefin interpolymer, and mixtures thereof.

29. The adhesive composition of claim 1 wherein the thermoplastic polymer is present in an amount ranging from about 20% by weight to about 50% by weight.

30. A hot melt adhesive composition comprising:
 a) about 10% by weight to about 50% by weight of at least one substantially aliphatic tackifying resin having a softening point of greater than 140° C.;
 b) about 20% by weight to about 60% by weight of at least one thermoplastic base polymer; and
 c) 0% by weight to about 40% by weight of at least one wax;
wherein said tackifying resin concentration is less than said thermoplastic base polymer concentration.

31. The adhesive composition of claim 22 wherein said tackifying resin concentration is less than said thermoplastic base polymer concentration.

32. The adhesive composition of claim 28 wherein said tackifying resin concentration is less than said thermoplastic base polymer concentration.

* * * * *

UNITED STATES PATENT AND TRADEMARK OFFICE
CERTIFICATE OF CORRECTION

PATENT NO. : 6,833,404 B2
DATED : December 21, 2004
INVENTOR(S) : Quinn et al.

It is certified that error appears in the above-identified patent and that said Letters Patent is hereby corrected as shown below:

Column 20,
Line 31, "about 40 % by weight or at least" should read -- about 40 % by weight of at least --.
Line 42, "vinyl caters and mixtures" should read -- vinyl esters and mixtures --.
Line 44, "aout 14 [degree symbol] F." should read -- about 140 [degree wymbol] F. --.

Signed and Sealed this

Seventh Day of June, 2005

JON W. DUDAS
*Director of the United States Patent and Trademark Office*